United States Patent
Hornby et al.

(10) Patent No.: US 9,399,975 B2
(45) Date of Patent: Jul. 26, 2016

(54) SOLENOID FLUID INJECTOR WITH CORROSION PREVENTION STRUCTURE

(71) Applicant: Continental Automotive Systems, Inc., Auburn Hills, MI (US)

(72) Inventors: Michael J. Hornby, Williamsburg, VA (US); Carl F. Hayden, Yorktown, VA (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 198 days.

(21) Appl. No.: 14/495,921

(22) Filed: Sep. 25, 2014

(65) Prior Publication Data

US 2016/0090952 A1  Mar. 31, 2016

(51) Int. Cl.
| | |
|---|---|
| *F02D 1/06* | (2006.01) |
| *F02M 51/06* | (2006.01) |
| *B05B 15/02* | (2006.01) |
| *F02M 61/16* | (2006.01) |
| *F02M 61/18* | (2006.01) |
| *F01N 3/20* | (2006.01) |

(52) U.S. Cl.
CPC .............. *F02M 51/061* (2013.01); *B05B 15/02* (2013.01); *F01N 3/2066* (2013.01); *F02M 51/0682* (2013.01); *F02M 61/166* (2013.01); *F02M 61/188* (2013.01); *F01N 2530/04* (2013.01); *F01N 2610/1453* (2013.01); *F02M 2200/05* (2013.01); *F02M 2200/9015* (2013.01); *F02M 2200/9053* (2013.01); *F02M 2200/956* (2013.01); *Y10S 239/04* (2013.01); *Y10S 239/19* (2013.01)

(58) Field of Classification Search
CPC ... F02M 51/061; F02M 1/18; F02M 51/0682; F02M 61/166; F02M 61/188; F02M 2200/9015; F02M 2200/9063; F02M 2200/956; F02M 2200/05; F02D 1/06; F01N 3/2066; F01N 2530/04; F01N 2610/1453; B05B 15/02; Y10S 239/04; Y10S 239/19
USPC ............ 239/5, 104, 585.1, 585.4, 585.5, 900, 239/DIG. 4, DIG. 19
See application file for complete search history.

(56) References Cited

U.S. PATENT DOCUMENTS

| | | | |
|---|---|---|---|
| 7,506,826 B2 * | 3/2009 | Miller | ..................... B05B 1/302 239/585.1 |
| 2003/0160116 A1 * | 8/2003 | Molnar | .............. F02M 51/0667 239/585.1 |
| 2007/0057095 A1 * | 3/2007 | Bayer | ................ F02M 51/0667 239/585.1 |
| 2014/0048629 A1 * | 2/2014 | McFarland | .......... F16K 31/0662 239/585.1 |

* cited by examiner

*Primary Examiner* — Steven J Ganey

(57) ABSTRACT

A fluid injector includes a valve structure movable in the passageway between a first position and a second position. The valve structure includes a hollow tube having a longitudinal axis and a valve member connected to an end of the tube by a weld, with a weld zone being defined inside of the tube generally adjacent to the weld. The tube has surfaces defining a through-hole that is disposed transversely with respect to the longitudinal axis of the tube. The through-hole permits the fluid to enter an interior of the tube. Corrosion prevention structure is disposed in the tube between the through-hole and the valve member to prevent the fluid in the tube from accessing the weld zone.

20 Claims, 2 Drawing Sheets

SOLENOID FLUID INJECTOR WITH CORROSION PREVENTION STRUCTURE

FIELD

The embodiment relates to a solenoid fluid injector and, more particularly, a solenoid fluid injector that includes a prevention structure to reduce susceptibility of corrosive attacks by the working fluid near a weld zone of the injector.

BACKGROUND

The Continental Deka VII fluid injector has traditionally been used only for low pressure multipoint gasoline engine fuel delivery systems. The absence of oxygenates in gasoline reduced the potential for corrosive attack on the injector fluid path components. In recent years, the Deka VII injector has been modified for use in exhaust after-treatment systems where the working fluid can be aqueous urea solution (AUS-32), with a heightened potential for corrosion. Alternatively, the fuels used for gasoline engines now have an increasing content of ethanol (an oxygenated fuel), and in some markets such as Brazil, the fuel can be often predominantly composed of ethanol. There are also modified configurations of the injector for the high ethanol content applications that provide active heating of the fuel, further increasing the potential for corrosive attack. The current configuration of the Deka VII (and next generation Deka) injector includes a weld of two subcomponents that are in a location where corrosion processes could be facilitated, leading to possible damage and failure of the injector when used in these corrosive environments.

With reference to FIGS. 1-3, the conventional Continental Deka VII fluid injector, generally indicated at 10, is a low pressure solenoid fluid injector which uses a standard ball 12 associated with on a conical valve seat 14, and orifice plate spray generator or metering disk 16 which is in widespread use for port gasoline injection. When the injector coil 18 is energized, the armature 20 is drawn to the stator 22, or pole piece. The armature 20 is connected to the metering ball 12 by a tube 24. Thus, the ball 12 is lifted off the injector valve seat 14 to allow pressurized fluid to flow across a metering disk 16.

With reference to FIG. 3, the armature-tube-ball assembly consists of three components that are welded together. The fluid flows through a hole 21 drilled through the longitudinal axis of the armature 20 into the tube 24. Surfaces in the tapered area of the tube 39 define at least one through-hole 26 that is disposed transversely with respect to a longitudinal axis of the tube 24. Due to cost considerations, the configuration uses a ball bearing as ball 12 and a drawn tube 24 which are laser welded together at weld 30 (FIG. 4).

The resultant weld joint creates a crevice volume V on the "back" side of the ball 12. This crevice volume V is in a zone Z (FIG. 3) where fluid is presumed to be mostly stagnant. The corrosion resistance of the material in the weld heat affected zone also tends to be somewhat weakened, despite the fact the materials of the welded subcomponents are stainless steels. The welding process can lead to a destruction or occupation of chromium sites, which form the passive oxidation layer that provides the corrosion resistance properties of stainless steels. Testing has shown that the combination of stagnant oxygenated fluid in the crevice volume and materials with weakened resistance leads to corrosion of this joint. The absence of corrosion on the "outside" surface of the joint is a result of a smooth flat surface and continual fluid flow across this surface.

Thus, there is also a need to eliminate the exposure of the weld zone inside the injector tube to the working fluid in a cost-effective manner.

SUMMARY

An object of the invention is to fulfill the needs referred to above. In accordance with the principles of an embodiment, this objective is obtained by providing a fluid injector having an inlet, an outlet, and a passageway providing a fluid flow conduit from the inlet to the outlet. The fluid injector includes a valve structure movable in the passageway between a first position and a second position. The valve structure includes a hollow tube having a longitudinal axis and a valve member connected to an end of the tube by a weld, with a weld zone being defined inside of the tube generally adjacent to the weld. Surfaces in the tube define a through-hole that is disposed transversely with respect to the longitudinal axis of the tube. The through-hole is constructed and arranged to permit the fluid to enter an interior of the tube. A seat is provided at the outlet and has at least one seat passage in communication with the passageway. The seat contiguously engages a portion of the valve member in the first position, thereby closing at least one seat passage and preventing fluid from exiting the at least one seat passage. The valve member, in the second position of the valve structure, is spaced from at least one seat passage so that fluid can move through the passageway and exit through at least one seat passage. Corrosion prevention structure is disposed in the tube between the through-hole and the valve member, and is constructed and arranged to prevent the fluid in the tube from accessing the weld zone.

In accordance with another aspect of a disclosed embodiment, a method prevents corrosion in a fluid injector. The fluid injector has an inlet, an outlet, a passageway providing a fluid flow conduit from the inlet to the outlet, and a valve structure movable in the passageway relative to a seat between a first position engaged with the seat to prevent fluid from exiting the outlet and a second position disengaged from the seat to permit fluid to exit the outlet. The valve structure includes a hollow tube having a longitudinal axis and a valve member connected to an end of the tube by a weld, with a weld zone being defined inside of the tube generally adjacent to the weld. The method provides a through-hole in the tube that is disposed transversely with respect to the longitudinal axis of the tube. The through-hole is constructed and arranged to permit the fluid to enter an interior of the tube. The method prevents the fluid in the interior of the tube from accessing the weld zone.

Other objects, features and characteristics of the present invention, as well as the methods of operation and the functions of the related elements of the structure, the combination of parts, and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENTS

Figure 5:
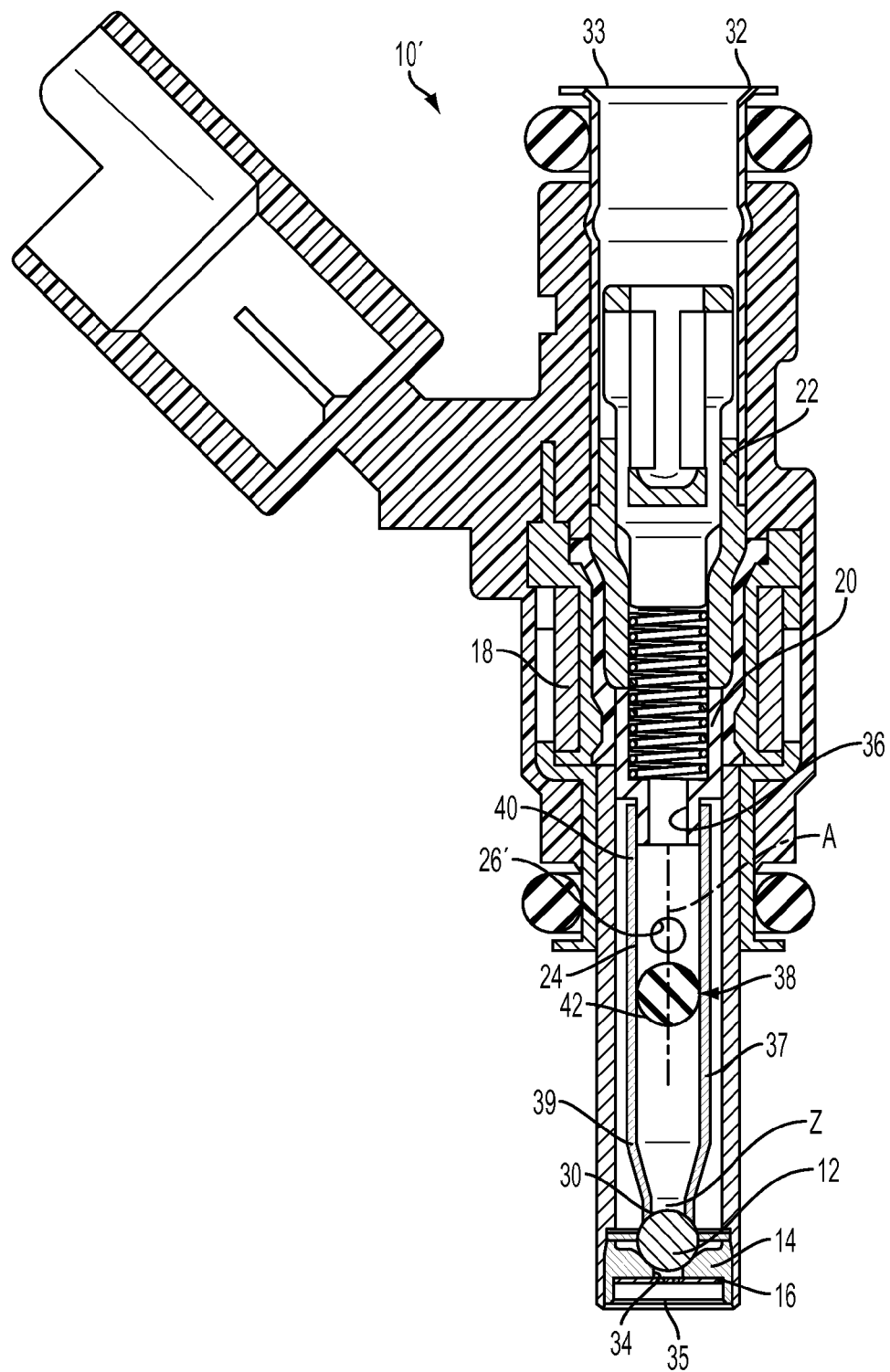
FIG. 5 is a cross-sectional view of a solenoid fluid injector having corrosion prevention structure in accordance with an embodiment.

With reference to FIG. 5, a fluid injector is shown, generally indicated at 10', in accordance with an embodiment. The fluid injector 10' has a fluid inlet 32 at an upstream end 33 of the injector, a fluid outlet 34 at a downstream end 35 of the injector, and a fluid passageway 36 extending from the fluid inlet 32 to the fluid outlet 34. The injector 10' is of the conventional, solenoid-operated type, having an armature 20 operated by a coil 18. Electromagnetic force is generated by current flow from the electronic control unit (not shown) through the coil 18. Movement of the armature 20 also moves an operatively attached hollow tube 24 and valve member 12 to positions that are either separated from or contiguously engaged with a seat 14. Preferably, the valve member 12 is a ball and the seat 14 is conical. An end of the tube 24 is joined to the valve member 12 by a weld 30 and the tube 24 and valve member 12 define valve structure of the injector 10'. The tube 24 and valve member 12 are preferably of stainless steel material. A weld zone Z is defined inside the tube 24 generally adjacent to the weld 30.

When the coil 18 is energized, the armature 20 moves toward a fixed pole piece 22 and the valve member 12 is lifted off the injector valve seat 14 to allow pressurized fluid to flow across a metering disk 16 in the conventional manner.

Figure 1:
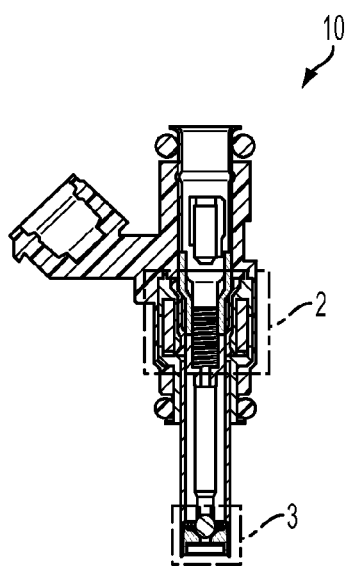
FIG. 1 is a view of a conventional cross-sectional view of a solenoid fluid injector.
Figure 2:
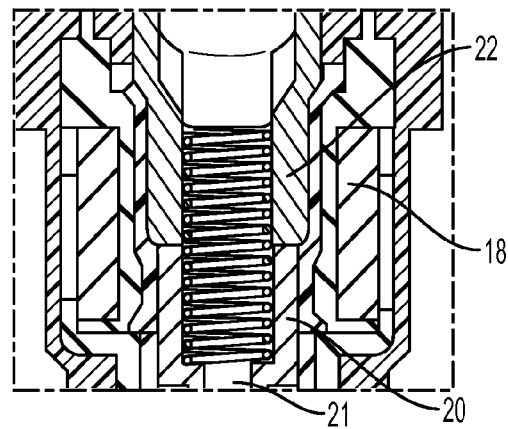
FIG. 2 is an enlarged view encircled at 2 in FIG. 1.
Figure 3:
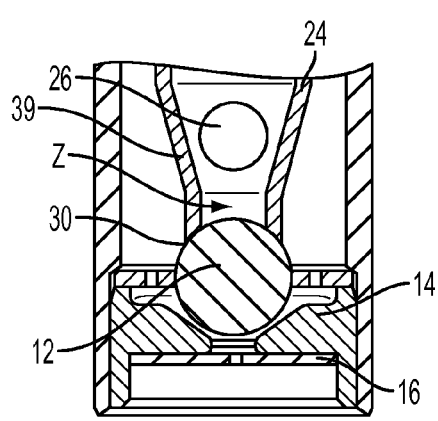
FIG. 3 is an enlarged view of a portion of the tube and the ball of the injector of FIG. 1, showing a flow through hole in the tube.
Figure 4:
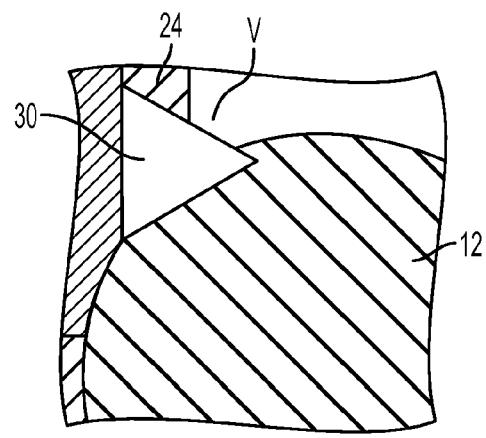
FIG. 4 is an enlarged view showing a weld connecting the tube to the ball of the injector of FIG. 1.

Surfaces in the tube 24 define at least one through-hole 26' that is disposed transversely with respect to a longitudinal axis A of the tube 24. In the embodiment, the tube 24 includes a constant diameter portion 37 and an adjacent tapered portion 39 that is disposed adjacent to the valve member 12. The through-hole 26' is provided in the constant diameter portion 37 of the tube 24. Thus, as compared to the hole 26 of the conventional injector 10 of FIG. 1, through-hole 26' of FIG. 6 is relocated so as to be disposed towards the upper end 40 of the tube 24 away from the tapered portion 39 of the tube 24.

The relocation of the hole 26' allows room for corrosion prevention structure, generally indicated at 38. The corrosion prevention structure 38 is provided in order to eliminate the exposure of the stagnation or weld zone Z inside the tube 24 to the working fluid. In the embodiment, the prevention structure 38 includes an elastomer plug 42 disposed inside the tube 24 between the through-hole 26' and the valve member 12 to prevent fluid inside the tube 24 from accessing the critical weld zone Z.

In the embodiment, the elastomer plug 42 consists of a spherical molded ball disposed in the constant diameter portion 37 of the tube 24. The plug 42 is preferably of a compliant elastomeric material that resists exposure to the working fluid, such as urea solution and hydrocarbon fuels. For example, the plug 42 can be composed of ethylene propylene diene monomer (EPDM) rubber or fluorocarbon (FKM) rubber. Although in this case the crevice volume V geometry and volume of the stagnation or weld zone Z still remain, the unadulterated material of the tube 24 and the elastomer plug 42 are sufficiently resistant to corrosive attack and prevent corrosion at the weld zone Z since the fluid inside the tube 24 is prevented from contacting surfaces of the valve member 12 and tube 24 near the weld 30.

It can be appreciated that the form of the plug 42 can take different shapes. For example, a cylinder or tapered cylinder shape may provide additional robustness by reducing the fluid-side crevice volume V that still exists as in the conventional injector 10. Likewise, the material from which the plug is constructed can also vary. For example, metallic plugs and/or cured-in-place sealants may be utilized in order to achieve resistance to specific fluids and/or aid in plug effectiveness.

The foregoing preferred embodiments have been shown and described for the purposes of illustrating the structural and functional principles of the present invention, as well as illustrating the methods of employing the preferred embodiments, and are subject to change without departing from such principles. Therefore, this invention includes all modifications encompassed within the spirit of the following claims.

What is claimed is:

1. A fluid injector having an inlet, an outlet, and a passageway providing a fluid flow conduit from the inlet to the outlet, the fluid injector comprising:
   a valve structure movable in the passageway between a first position and a second position, the valve structure including a hollow tube having a longitudinal axis and a valve member connected to an end of the tube by a weld, with a weld zone being defined inside of the tube generally adjacent to the weld, the tube having surfaces defining a through-hole that is disposed transversely with respect to the longitudinal axis of the tube, the through-hole being constructed and arranged to permit the fluid to enter an interior of the tube,
   a seat, at the outlet, having at least one seat passage in communication with the passageway, the seat contiguously engaging a portion of the valve member in the first position thereby closing the at least one seat passage and preventing fluid from exiting the at least one seat passage, the valve member, in the second position of the valve structure being spaced from the at least one seat passage so that fluid can move through the passageway and exit through the at least one seat passage, and
   corrosion prevention structure disposed in the tube between the through-hole and the valve member, constructed and arranged to prevent the fluid in the tube from accessing the weld zone.

2. The injector of claim 1, wherein the valve member is in the form of a ball.

3. The injector of claim 1, wherein the tube and the valve member are each composed of stainless steel material.

4. The injector of claim 1, wherein the corrosion prevention structure is a plug composed of an elastomer material.

5. The injector of claim 4, wherein the plug is of spherical shape.

6. The injector of claim 1, wherein the corrosion prevention structure is constructed and arranged to be resistant to urea solution as the fluid.

7. The injector of claim 6, wherein the corrosion prevention structure is composed of ethylene propylene diene monomer (EPDM) rubber or of fluorocarbon (FKM) rubber.

8. The injector of claim 1, wherein the corrosion prevention structure is constructed and arranged to be resistant to hydrocarbon fuels as the fluid.

9. The injector of claim 1, wherein the tube includes a constant diameter portion and a tapered portion, which is disposed adjacent to the valve member, the through-hole being provided in the constant diameter portion.

10. The injector of claim 9, wherein the corrosion prevention structure is a spherical plug disposed in the constant diameter portion of the tube.

11. A method of preventing corrosion in a fluid injector, the fluid injector having an inlet, an outlet, a passageway providing a fluid flow conduit from the inlet to the outlet, and a valve structure movable in the passageway relative to a seat between a first position engaged with the seat to prevent fluid from exiting the outlet and a second position disengaged from the seat to permit fluid to exit the outlet, the valve structure including a hollow tube having a longitudinal axis and a valve member connected to an end of the tube by a weld, with a weld zone being defined inside of the tube generally adjacent to the weld, the method comprising the steps of:
 providing a through-hole in the tube that is disposed transversely with respect to the longitudinal axis of the tube, the through-hole being constructed and arranged to permit the fluid to enter an interior of the tube, and
 preventing the fluid in the interior of the tube from accessing the weld zone.

12. The method of claim 11, wherein the preventing step includes providing a plug in the tube between the through-hole and the valve member.

13. The method of claim 12, wherein the plug is provided to be resistant to urea solution as the fluid or to hydrocarbon fuels as the fluid.

14. The method of claim 13, wherein the plug is composed of ethylene propylene diene monomer (EPDM) rubber or of fluorocarbon (FKM) rubber.

15. The method of claim 11, wherein the valve member is in the form of a ball.

16. The method of claim 15, wherein the plug is provided from an elastomer material.

17. The method of claim 16, wherein the plug is provided as a spherical member.

18. The method of claim 11, wherein the tube and the valve member are each composed of stainless steel material.

19. The method of claim 11, wherein the tube includes a constant diameter portion and a tapered portion, which is disposed adjacent to the valve member, and wherein the through-hole is provided in the constant diameter portion.

20. The method of claim 19, wherein the plug is of spherical shape and is disposed in the constant diameter portion of the tube.

* * * * *